(12) United States Patent
Saltenberger

(10) Patent No.: US 7,926,767 B2
(45) Date of Patent: Apr. 19, 2011

(54) FASTENER FOR FASTENING TO A STUD

(75) Inventor: Reimar Saltenberger, Niederwetz (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/263,764

(22) Filed: Nov. 3, 2008

(65) Prior Publication Data

US 2009/0113675 A1    May 7, 2009

(30) Foreign Application Priority Data

Nov. 7, 2007   (DE) .......................... 10 2007 053 548

(51) Int. Cl.
*F16L 3/08*    (2006.01)

(52) U.S. Cl. .......... 248/74.3; 248/68.1; 248/69; 248/71; 248/49; 24/16 PB; 24/17 AP

(58) Field of Classification Search ............ 248/49, 248/68.1, 69, 71, 74.3; 24/16 PB, 17 AP
See application file for complete search history.

(56) References Cited

U.S. PATENT DOCUMENTS

| 3,525,128 | A | * | 8/1970 | Hidassy ................. 24/16 PB |
| 4,728,064 | A | * | 3/1988 | Caveney .................. 248/74.3 |
| 4,860,979 | A | * | 8/1989 | Camenisch ............... 248/74.3 |
| 5,135,188 | A | * | 8/1992 | Anderson et al. ........... 248/74.3 |
| 5,154,376 | A | * | 10/1992 | Baum et al. .............. 248/74.3 |
| 5,598,994 | A | * | 2/1997 | Olewinski et al. ............ 248/73 |
| 5,803,413 | A | * | 9/1998 | Benoit et al. ............... 248/73 |
| 5,926,921 | A | * | 7/1999 | Benoit .................. 24/16 PB |
| 6,115,888 | A | * | 9/2000 | Kraus ................... 24/16 PB |
| 6,186,451 | B1 | * | 2/2001 | Benoit .................. 248/74.3 |
| 6,206,330 | B1 | * | 3/2001 | Oi et al. .................. 248/68.1 |
| 6,240,602 | B1 | | 6/2001 | Geiger |
| 6,253,421 | B1 | * | 7/2001 | Kraus ................... 24/16 PB |
| 6,708,931 | B2 | * | 3/2004 | Miura ................... 248/68.1 |
| 2004/0065785 | A1 | * | 4/2004 | Miura et al. .............. 248/62 |
| 2004/0144897 | A1 | * | 7/2004 | Maruyama ............... 248/68.1 |
| 2005/0051676 | A1 | * | 3/2005 | Del Sordo et al. .......... 248/74.3 |

FOREIGN PATENT DOCUMENTS

| EP | 0751597 A | 1/1997 |
| WO | 9822740 A | 5/1998 |

* cited by examiner

*Primary Examiner* — Anita M King
*Assistant Examiner* — Nkeisha J Smith
(74) *Attorney, Agent, or Firm* — Michael P. Leary

(57) ABSTRACT

A fastener including a body that has, extending along a center axis, an opening with an insertion end for inserting a stud. The fastener further includes a detent pawl that is attached to a first inner wall of the opening and extends toward the center axis. A yoke is attached to a second inner wall of the opening and spaced axially apart from the detent pawl. The yoke projects into the opening and, together with the second inner wall, forms a yoke opening into which the stud can be inserted during installation.

16 Claims, 1 Drawing Sheet

US 7,926,767 B2

FASTENER FOR FASTENING TO A STUD

CROSS-REFERENCE TO RELATED APPLICATIONS

This application claims the benefit of German Application No. 10 2007 053 548.3, filed Nov. 7, 2007, the disclosure of which is incorporated herein by reference.

BACKGROUND OF THE INVENTION

The invention relates to a fastener for fastening a component to a stud, with a body that has, extending along a center axis, an opening with an insertion end for inserting the stud, and has a detent pawl that is attached to a first inner wall of the opening and extends toward the center axis.

Fasteners of the specified type are used in a variety of designs in order to be able to fasten components such as cables, pipes, or the like to a stud by means of simple installation procedures and without the use of special installation tools. In a fastener of the specified type known from U.S. Pat. No. 6,240,602 B1, the body has a cylindrical bore which is large enough to permit the easy insertion of a cylindrical stud equipped with an outside thread. Two longitudinal grooves are formed opposite one another in the cylindrical wall of the bore, and arranged in at least one longitudinal groove is a detent pawl that projects into the bore and is fastened to the bottom of the groove by a flexible web. When a threaded stud is inserted into the bore, the detent pawl is bent down, in which process it engages the stud thread, thereby retaining the stud in the bore opposite the direction of insertion, while the threaded stud is supported in the radial direction against the inner wall of the bore. The prior art fastener additionally has a molded, flexible strap and a lock with an opening in which the inserted end of the strap can be held in place by means of a locking tooth. The prior art fastener is prevented from tipping motions relative to the stud by the cylindrical bore, whose inside diameter only slightly exceeds the outside diameter of the threaded stud. However, it is disadvantageous here that the diameters of the stud and bore have to be matched to one another quite precisely, with the result that dimensional variations and dirt can hinder the installation process.

SUMMARY OF THE INVENTION

In contrast, an aspect of the invention is to create a fastener of the initially mentioned type that can be held in place on a stud such that it is secure from tipping, but whose opening can be dimensioned sufficiently large that dirt and dimensional variations cannot interfere with the installation process. Moreover, it should be possible to move the fastener in at least one radial direction to compensate for position differences relative to the stud. It is an additional object to design the fastener such that it can be manufactured from plastic in a simple, two-part mold by the injection molding process.

According to an aspect of the invention is attained by a fastener with the initially mentioned features in that, attached to a second inner wall of the opening and spaced axially apart from the detent pawl, is a yoke that projects into the opening and that, together with the second inner wall, forms a yoke opening into which the stud can be inserted during installation.

In the fastener designed according to an aspect of the invention, a stud that is inserted into the opening is pressed against the second inner wall, firstly by the detent pawl and secondly by the yoke at a location spaced axially apart from the detent pawl. By this means, the second inner wall of the fastener is held on the stud such that it is secure from tipping. Aside from the contact points of the stud with the second inner wall, the detent pawl, and the yoke, the inner wall of the body can enclose the stud with generous spacing, so that dimensional variations and dirt cannot interfere with or impair the simple and easy installation of the fastener on a stud. The second inner wall of the opening, the detent pawl, and the yoke can also be designed such that the fastener can be moved on the stud parallel to the second inner wall in order to compensate for position variations during installation. As a result of the design of the yoke, which is comparable in its action to a second detent pawl, the fastener can be manufactured in a single piece from a thermoplastic material or another comparable material by means of a simple two-part injection mold.

According to another aspect of the invention, the yoke itself can be elastically deformable, but it can also be attached to the second inner wall of the opening by elastic flexible joints. The yoke may extend from the attachment point on the second inner wall towards the center axis of the opening and towards the insertion end. The yoke is then carried along in the insertion direction by the stud inserted into the opening, during which process the yoke opening enlarges far enough toward the first inner wall that the stud can enter it. If the stud is then moved in the opposite direction relative to the fastener, the yoke catches on the stud, thus holding the fastener in place on the stud in the same manner as the detent pawl.

The yoke may have two parallel arms, which are attached at one end to the second inner wall and which are joined to one another at the other end by a web. Thus, the two arms and the web, together with the second inner wall, delimit the yoke opening. According to an aspect of the invention, the web can have, on the side facing the inner wall, a suitable profile for engaging in a stud thread.

The body of the fastener may have a fastening section that is designed for fastening a component. The fastening section can be designed as an elastic clip, but it can also have a strap and a look for fastening the free end of the strap.

BRIEF DESCRIPTION OF THE DRAWINGS

The invention is explained in detail below on the basis of an example embodiment which is shown in the drawing. Shown are.

DETAILED DESCRIPTION OF EXEMPLARY EMBODIMENTS OF THE INVENTION

Figure 1:
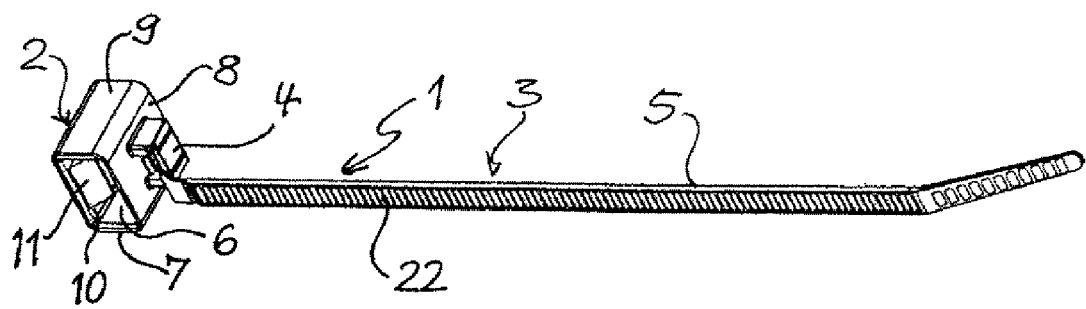
FIG. 1 a perspective view of a fastener according to an exemplary embodiment of the invention, FIG. 2 a longitudinal section of the fastener from FIG. 1, and FIG. 3 a view A of the fastener from FIG. 1.
Figure 2:
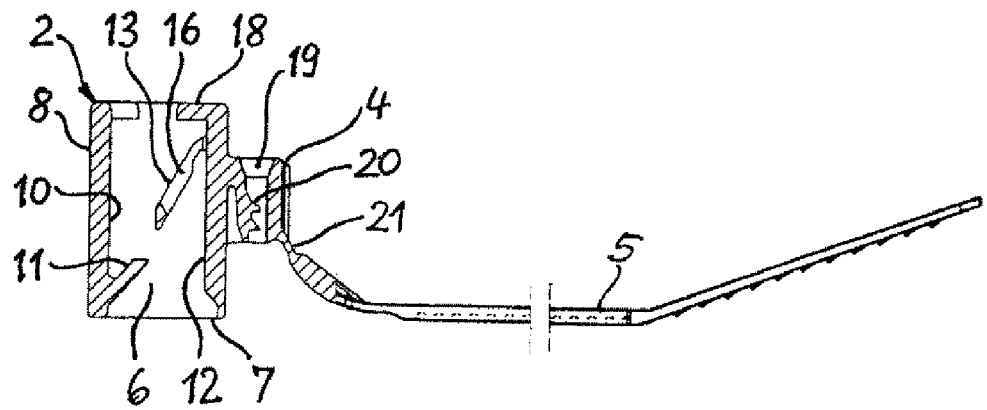
Figure 3:
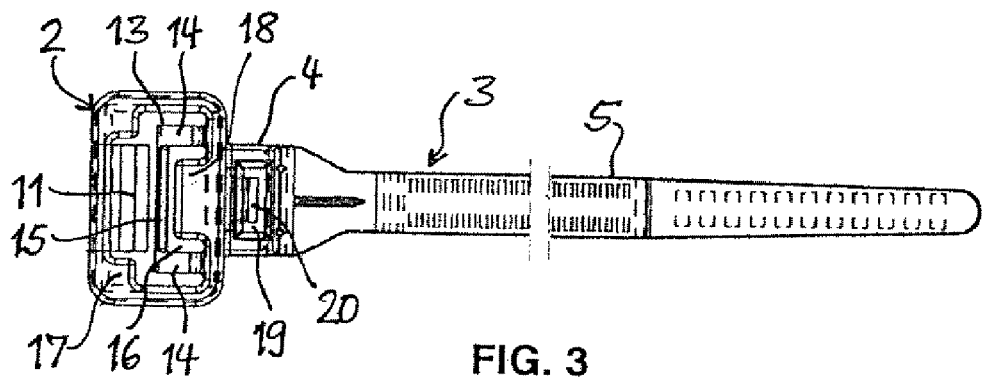

The fastener 1 according to an exemplary embodiment of the invention shown in FIG. 1 includes a block-shaped body 2 and a fastening section 3, which consists of a lock 4 and a strap 5. The lock 4 is likewise block-shaped in design and is located externally approximately in the center of one wide side of the body 2. All parts of the fastener 1 are manufactured of plastic as a single piece through primary molding.

For the purpose of fastening to a stud provided with an outside thread or similar profiling, the body 2 has a block-shaped opening 6, which extends from an insertion end 7, parallel to the wide sides 8 and narrow sides 9 of the body 2. A detent pawl 11 is formed within the opening 6, on a first inner wall 10 composed of a wide side 8, near the insertion end 7. The detent pawl 11 is shaped like a rectangular plate, and is arranged at a 45°-angle to the inner wall 10 in such a manner that its distance from the insertion end 7 increases with increasing distance from the inner wall 10. The lateral ends of the detent pawl 11 are located a distance from the inner walls formed by the narrow sides 9. At its free edge parallel to the inner wall 10, the detent pawl 11 has profiling suitable for engaging with the thread of a stud.

A yoke 13 is molded on an inner wall 12 of the opening 6 opposite the inner wall 10. The yoke 13 has two arms 14, each of which is arranged parallel to and a short distance away from an inner wall composed of a narrow side 9, and is connected at one end to the inner wall 12 by a flexible joint. The free ends of the arms 14 are joined to one another by a straight web 15, which extends parallel to the inner wall 12 and has, on its side facing the inner wall 12, a suitable profile for engagement with the thread of a stud. The flexible joints of the arms 14 are designed such that the arms 14 in their rest position extend at an angle of approximately 30° to the inner wall 12 in such a manner that they approach the insertion end 7 more closely with increasing distance from the inner wall 12. As a result of the design described, the yoke 13, together with the inner wall 12, forms a yoke opening 16, which is intended to accommodate a section of a stud.

The end of the opening 6 opposite the insertion end 7 is partially closed by inwardly projecting wall sections 17, 18. The opening 6 is open to the top in the areas above the detent pawl 11 and the yoke 13, which must be accessible from above for molding of the same.

The lock 4 has an open-ended lock opening 19 extending parallel to the opening 6. Located in the lock opening 19 is a detent pawl 20 provided with two locking teeth. The strap 5, with a flexible end section 21, is molded on the lower end of the lock 14 facing the insertion end 7. On its underside, it has a tooth profile 22 which the locking teeth of the detent pawl 20 engage with when the strap 5 is drawn into the lock opening 19.

In order to connect the fastener 1 to a stud provided with an outside thread, for example, it is only necessary to press the body 2, with the insertion end 7 foremost, onto the stud in such a way that the stud can enter the opening 6. During this process, the stud is first directed towards the inner wall 12 by the angled detent pawl 11. As soon as the stud contacts the inner wall 12, the detent pawl 11 begins to elastically deform towards the inner wall 10, so that the stud can penetrate deeper into the opening 6 past the pawl. The forward end of the stud subsequently makes contact with the web 15 of the yoke 13, causing the yoke 13 to be bent upward as the stud continues inward. This causes the web 15 to move away from the inner wall 12, finally reaching such a distance therefrom that the stud can penetrate the yoke opening 16. The penetration depth of the stud is ultimately limited either by a stud flange coming into contact with the insertion end 7 of the body 2 or by the forward stud end striking the wall section 18. In the final position reached, both the detent pawl 11 and the yoke 13 retain the stud in its position on the inner wall 12, with the detent pawl 11 and the web 15 engaging in the thread profile of the stud, thereby securing the body 2 against loosening from the stud. As a result of the pressure of the stud against the inner wall 12 accomplished with the aid of both the detent pawl 11 and the yoke 13, the body 2 is kept from tipping so that a defined position of the component held by the fastener with respect to the stud is provided. In the longitudinal direction of the detent pawl 11 and the web 15, the body 2 can be moved within limits without impairing its fixing relative to the stud, so that a compensation of position variations is possible in this direction.

Fastening of a component to the fastener 1 can be accomplished by closing the strap 5 both before and after mounting of the body 2 on a stud.

Exemplary embodiments of the present invention have been described for illustrative purposes, and those skilled in the art will appreciate that various modifications, additions and substitutions are possible, without departing from the scope and spirit of the invention as disclosed in the accompanying claims.

What is claimed is:

1. A fastener for securing a component to a stud, the fastener comprising:
    a body that has, extending along a center axis, an opening for installation of the body over the stud, and with an insertion end for inserting the stud, and
    a detent pawl that is attached to a first inner wall of the opening and extends toward the center axis in a first radial direction and away from the insertion end of the opening in a first axial direction,
    wherein, a yoke, for holding the stud within the body, is attached to a second inner wall of the opening and spaced axially apart from the detent pawl, the yoke projecting into the opening and, together with the second inner wall, forms a yoke opening into which the stud can be inserted during installation,
    wherein the yoke has two arms, which are attached at one end to the second inner wall and which are joined to one another at the other end by a web, and the two arms and second wall and web define a loop, and the web is axially movable within the body opening, and the yoke extends from the second inner wall in a second radial direction opposite to the first radial direction and in a second axial direction opposite to the first axial direction.

2. The fastener according to claim 1, wherein the yoke is elastically deformable.

3. The fastener according to claim 1, wherein the yoke is attached to the second inner wall by a flexible joint.

4. The fastener according to claim 1, wherein the yoke extends from the attachment point on the second inner wall radially towards the center axis of the opening and axially towards the insertion end.

5. The fastener according to claim 1, wherein the web has a stud Thread engaging profile.

6. The fastener according to claim 1, wherein the body has a fastening section for fastening the component.

7. The fastener according to claim 6, wherein the fastening section has a strap with a free end, and a lock, and the free end of the strap can be fastened in the lock.

8. A fastener for securing a component to a stud, the fastener comprising:
    a generally hollow body defining a substantially rectangular box and comprising at least a first wall and a second wall and a third wall and a fourth wall, the first, second, third, and fourth walls partly defining the substantially rectangular box;
    and the first and second walls of the body are opposite walls of the rectangular box and further comprising;
    an insertion opening at one end of the body, the insertion opening comprising an open end of the rectangular box, the open end being perpendicular to the first and second walls;
    a detent pawl attached to an inner surface of the first wall the detent pawl extends away from the insertion opening; and
    a yoke defining a loop, for holding a stud within the body, attached to an inner surface of the second wall, the yoke being offset from the detent pawl along a longitudinal axis of the body and the yoke extends towards the insertion opening.

9. The fastener according to claim 8, wherein the yoke is elastically deformable.

10. The fastener according to claim 8, wherein the yoke comprises two arms, where first ends of the arms are connected to the inner surface of the second wall and wherein second ends of the arms are connected to one another by a web.

11. The fastener according to claim 9, wherein the yoke is attached to the second inner wall by a flexible joint.

12. The fastener according to claim 8, wherein the detent pawl is attached to the first wall at a first position and the yoke is attached to the second wall at a second position, wherein the first position is closer to the insertion opening than the second position is to the insertion opening.

13. The fastener according to claim 8, further comprising a locking part attached to an outer surface of the body and a strap extending from the locking part, the locking part being configured to receive an end of the strap.

14. A fastener for securing a component to a stud, the fastener comprising:
 a body portion configured to receive the stud;
 a locking portion attached to the body portion; and
 a flexible strap with a first end attached to the locking portion and a second end configured to be received by the locking portion;
 wherein the body portion comprises four walls defining a substantially rectangular box shape with open ends;
 wherein one of the open ends comprises an insertion opening for receiving the stud;
 wherein a detent pawl extends from an inner surface of a first wall of the body portion and away from the insertion opening;
 wherein a yoke extends from an inner surface of a second wall of the body portion and towards the insertion opening, the second wall being opposite the first wall; and
 wherein the yoke comprises two parallel arms, which are attached at one end to the second inner wall and which are joined to one another at the other end by a web, and the yoke is for encompassing the stud.

15. The fastener according to claim 14, wherein the body has a longitudinal direction and a transverse direction that is perpendicular to the longitudinal direction, and in the transverse direction the first wall and the second wall are longer than a third wall and a fourth wall.

16. The fastener according to claim 15, wherein the locking portion is located on an exterior surface of one of the first wall and the second wall.

* * * * *